United States Patent
Nayak et al.

(10) Patent No.: US 12,035,167 B2
(45) Date of Patent: Jul. 9, 2024

(54) METHOD AND APPARATUS FOR EXCHANGING TRAFFIC CHARACTERISTICS INFORMATION IN WI-FI SYSTEMS

(71) Applicant: Samsung Electronics Co., Ltd., Suwon-si (KR)

(72) Inventors: Peshal Nayak, Plano, TX (US); Rubayet Shafin, Allen, TX (US); Boon Loong Ng, Plano, TX (US); Wenxun Qiu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 17/676,622

(22) Filed: Feb. 21, 2022

(65) Prior Publication Data

US 2022/0272566 A1 Aug. 25, 2022

Related U.S. Application Data

(60) Provisional application No. 63/282,130, filed on Nov. 22, 2021, provisional application No. 63/180,477, (Continued)

(51) Int. Cl.
*H04W 28/02* (2009.01)
*H04L 69/22* (2022.01)
(Continued)

(52) U.S. Cl.
CPC ......... *H04W 28/0268* (2013.01); *H04L 69/22* (2013.01); *H04W 52/0216* (2013.01); *H04W 80/02* (2013.01)

(58) Field of Classification Search
None
See application file for complete search history.

(56) References Cited

U.S. PATENT DOCUMENTS 11,523,306 B1 * 12/2022 Chu ................ H04L 69/324
2015/0189538 A1 * 7/2015 Han ................ H04W 48/20
370/230

(Continued)

FOREIGN PATENT DOCUMENTS

WO WO2021183045 * 9/2021

OTHER PUBLICATIONS

IEEE Standards Association; IEEE Std. 802.11-2020; IEEE Standard for Information Technology—Telecommunications and Information Exchange between Systems—Local and metropolitan area networks—Specific requirements; "Part 11: Wireless LAN Medium Access Control (MAC) and Physical Layer (PHY) Specifications"; 2020, 4379 pgs.

(Continued)

*Primary Examiner* — Andre Tacdiran

(57) ABSTRACT

Embodiments of the present disclosure provide methods and apparatuses for requesting traffic characteristics in a wireless network. The apparatuses include a wireless station (STA) device comprising a transceiver and a processor operably coupled to the transceiver. The transceiver is configured to transmit and receive signals. The processor is configured to generate a traffic profile request element that comprises an indication of a request for an access point (AP) to provide, to the STA, traffic characteristics, as observed at the AP, of downlink (DL) traffic between the AP and the STA. The transceiver is further configured to transmit to the AP the traffic profile request element. The requested traffic characteristics are used to determine target wake time (TWT) parameters for a TWT operation between the AP and the STA.

20 Claims, 10 Drawing Sheets

Related U.S. Application Data filed on Apr. 27, 2021, provisional application No. 63/178,113, filed on Apr. 22, 2021, provisional application No. 63/153,790, filed on Feb. 25, 2021.

(51) Int. Cl.
*H04W 52/02* (2009.01)
*H04W 80/02* (2009.01)

(56) References Cited

U.S. PATENT DOCUMENTS

| | | | |
|---|---|---|---|
| 2016/0381704 A1* | 12/2016 | Chu | H04W 52/0216 370/329 |
| 2017/0303298 A1* | 10/2017 | Zhang | H04W 72/52 |
| 2019/0053155 A1 | 2/2019 | Kneckt et al. | |
| 2020/0059959 A1* | 2/2020 | Turtinen | H04W 74/006 |
| 2020/0137612 A1* | 4/2020 | Li | H04W 52/0216 |
| 2020/0359327 A1 | 11/2020 | Bhanage et al. | |
| 2021/0022154 A1 | 1/2021 | Cavalcanti et al. | |
| 2021/0037464 A1 | 2/2021 | Cariou et al. | |
| 2021/0219186 A1* | 7/2021 | Canpolat | H04W 28/24 |

OTHER PUBLICATIONS

IEEE Standards Association; IEEE 802.11-2016; IEEE Standard for Information technology—Telecommunications and Information exchange between systems—Local and metropolitan area networks—Specific requirements; Part 11: Wireless LAN Medium Access Control (MAC) and Physical Layer (PHY) Specifications; 2016, 3534 pgs.

IEEE P802.11ax/D8.0; Draft Standard for Information technology—Telecommunications and information exchange between systems Local and metropolitan area networks—Specific requirements; "Part 11: Wireless LAN Medium Access Control (MAC) and Physical Layer (PHY) Specifications"; "Amendment 1: Enhancements for High Efficiency WLAN"; LAN/MAN Standards Committee of the IEEE Computer Society; Oct. 2020; 820 pgs.

Ming Gan, et al.; IEEE 802.11-19/1988-03-00be; "Power Save for Multi-link"; Nov. 11, 2019; 15 pgs.

International Search Report and Written Opinion dated Jun. 2, 2022 regarding International Application No. PCT/KR2022/002750, 9 pages.

Ho et al., "TSPEC for Low Latency for R1", IEEE 802.11-20/1693r4, Oct. 2020, 12 pages.

Extended European Search Report issued Mar. 25, 2024 regarding Application No. 22760100.2, 9 pages.

* cited by examiner

FIG. 9

| Frame Control | Duration /ID | Address 1 | Address 2 | Address 3 | Sequence Control | Address 4 | QoS Control | HT Control | Timestamp |
|---|---|---|---|---|---|---|---|---|---|
| 2 | 2 | 6 | 0 or 6 | 0 or 6 | 0 or 2 | 0 or 6 | 0 or 2 | 0 or 4 | 4 |

Octet

FIG. 10

| Frame Control | Duration /ID | Address 1 | Address 2 | Address 3 | Sequence Control | Address 4 | QoS Control | HT Control | Buffering Time |
|---|---|---|---|---|---|---|---|---|---|
| 2 | 2 | 6 | 0 or 6 | 0 or 6 | 0 or 2 | 0 or 6 | 0 or 2 | 0 or 4 | 4 |

Octet

FIG. 11

| Element ID | Length | SCSID | Request Type | Intra-Access Category Priority element (optional) | TCLAS Elements (optional) | TCLAS Elements (optional) | TSPEC Request IE | Optional subelements |
|---|---|---|---|---|---|---|---|---|
| 1 | 1 | 1 | 1 | 0 or 3 | variable | 0 or 3 | variable | variable |

Octets:

METHOD AND APPARATUS FOR EXCHANGING TRAFFIC CHARACTERISTICS INFORMATION IN WI-FI SYSTEMS

CROSS-REFERENCE TO RELATED APPLICATION(S) AND CLAIM OF PRIORITY

This application claims priority under 35 U.S.C. § 119(e) to U.S. Provisional Patent Application No. 63/153,790 filed on Feb. 25, 2021; U.S. Provisional Patent Application No. 63/178,113 filed on Apr. 22, 2021; U.S. Provisional Patent Application No. 63/180,477 filed on Apr. 27, 2021; and U.S. Provisional Patent Application No. 63/282,130 filed on Nov. 22, 2021, which are hereby incorporated by reference in their entirety.

TECHNICAL FIELD

This disclosure relates generally to power management in wireless communications systems. Embodiments of this disclosure relate to methods and apparatuses for requesting traffic characteristics for use in target wake time configuration for communications in a wireless local area network communications system.

BACKGROUND

With the standardization process of the next generation IEEE 802.11 wireless local area network (WLAN), i.e., IEEE 802.11ax amendment entering the final stage, the IEEE 802.11ax amendment is drawing attention of the information technology (IT) industry. It newly introduces features for improving peak throughput and efficiency in an environment crowded by many 802.11 devices. Example environments include airports, stadiums, and so on. Wi-Fi alliance (WFA) has already launched the WI-FI 6 certification program for guaranteeing interoperability between certified products implementing IEEE 802.11ax amendment. In the market, device manufacturers are already starting to release WI-FI 6 certified smart mobile devices.

Target Wake Time (TWT) is one of the important features of the IEEE 802.11ax amendment. TWT enables wake time negotiation between an access point (AP) and an associated station (STA) for improving power efficiency. With TWT operation, it suffices for a STA to only wake up at pre-scheduled time negotiated with another STA or AP in the network. In IEEE 802.11ax standards, two types of TWT operation are possible—individual TWT operation and broadcast TWT operation. Individual TWT agreements can be established between two STAs or between a STA and an AP. On the other hand, with broadcast TWT operation, an AP can set up a shared TWT session for a group of STAs.

The negotiated parameters such as the wake interval, wake duration and initial wake time (offset) highly affect latency, throughput as well as power efficiency, which are directly related to QoS (quality of service) or customer experiences. Services with different traffic characteristics will have different TWT parameter configurations for better QoS. Additionally, the TWT configuration should adapt to network and service status variation.

Multi-link operation (MLO) is another key feature that is currently being developed by the standards body for next generation extremely high throughput (EHT) WI-FI systems, IEEE 802.11be. The WI-FI devices that support MLO are referred to as multi-link devices (MLD). With MLO, it is possible for a non-AP MLD to discover, authenticate, associate, and set up multiple links with an AP MLD. Channel access and frame exchange is possible on each link between the AP MLD and non-AP MLD.

When TWT agreements are set up over one or multiple links between an AP MLD and a non-AP MLD, the TWT requesting non-AP STAs affiliated with the non-AP MLD may not have traffic delay information at the peer STAs affiliated with the AP MLD. With this traffic delay information, non-AP STAs affiliated with non-AP MLD may select appropriate TWT parameters in order to support low-latency traffic over multiple links.

Traffic specification (TSPEC) is another important feature integrated in WI-FI systems. The TSPEC element (or information element) contains parameters that define the characteristics and QoS expectations of a traffic flow.

SUMMARY

Embodiments of the present disclosure provide methods and apparatuses for requesting traffic characteristics in a wireless network (e.g., a WLAN).

In one embodiment, a STA device is provided, comprising a transceiver and a processor operably coupled to the transceiver. The transceiver is configured to transmit and receive signals. The processor is configured to generate a traffic profile request element that comprises an indication of a request for an AP to provide, to the STA, traffic characteristics, as observed at the AP, of downlink (DL) traffic between the AP and the STA. The transceiver is further configured to transmit to the AP the traffic profile request element. The requested traffic characteristics are used to determine TWT parameters for a TWT operation between the AP and the STA.

In another embodiment, an AP device is provided, comprising a transceiver and a processor operably coupled to the transceiver. The transceiver is configured to receive from a STA a traffic profile request element that comprises an indication of a request for the AP to provide, to the STA, traffic characteristics, as observed at the AP, of DL traffic between the AP and the STA. The processor is configured to generate a traffic profile element that includes the requested traffic characteristics. The transceiver is further configured to transmit to the STA the traffic profile element. The requested traffic characteristics are related to TWT parameters for a TWT operation between the AP and the STA.

In another embodiment, a method for requesting traffic characteristics in a wireless network is provided, including the steps of generating a traffic profile request element that comprises an indication of a request for an AP to provide, to a STA, traffic characteristics, as observed at the AP, of DL traffic between the AP and the STA, and transmitting the traffic profile request element to the AP. The requested traffic characteristics are used to determine TWT parameters for a TWT operation between the AP and the STA.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] IEEE 802.11-2020, "Wireless LAN Medium Access Control (MAC) and Physical Layer (PHY) Specification".

[2] IEEE P802.11ax/D8.0-26.8 (TWT Operation).

[3] IEEE Std 802.11-2020-10.47 (Target Wake Time).

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates an example MAC header that includes an additional timestamp subfield according to various embodiments of the present disclosure;

FIG. 10 illustrates an example MAC header that includes an additional buffering time subfield according to various embodiments of the present disclosure;

FIG. 11 illustrates an example SCS Descriptor element containing a TSPEC Request IE according to various embodiments of the present disclosure.

DETAILED DESCRIPTION

Figure 1:
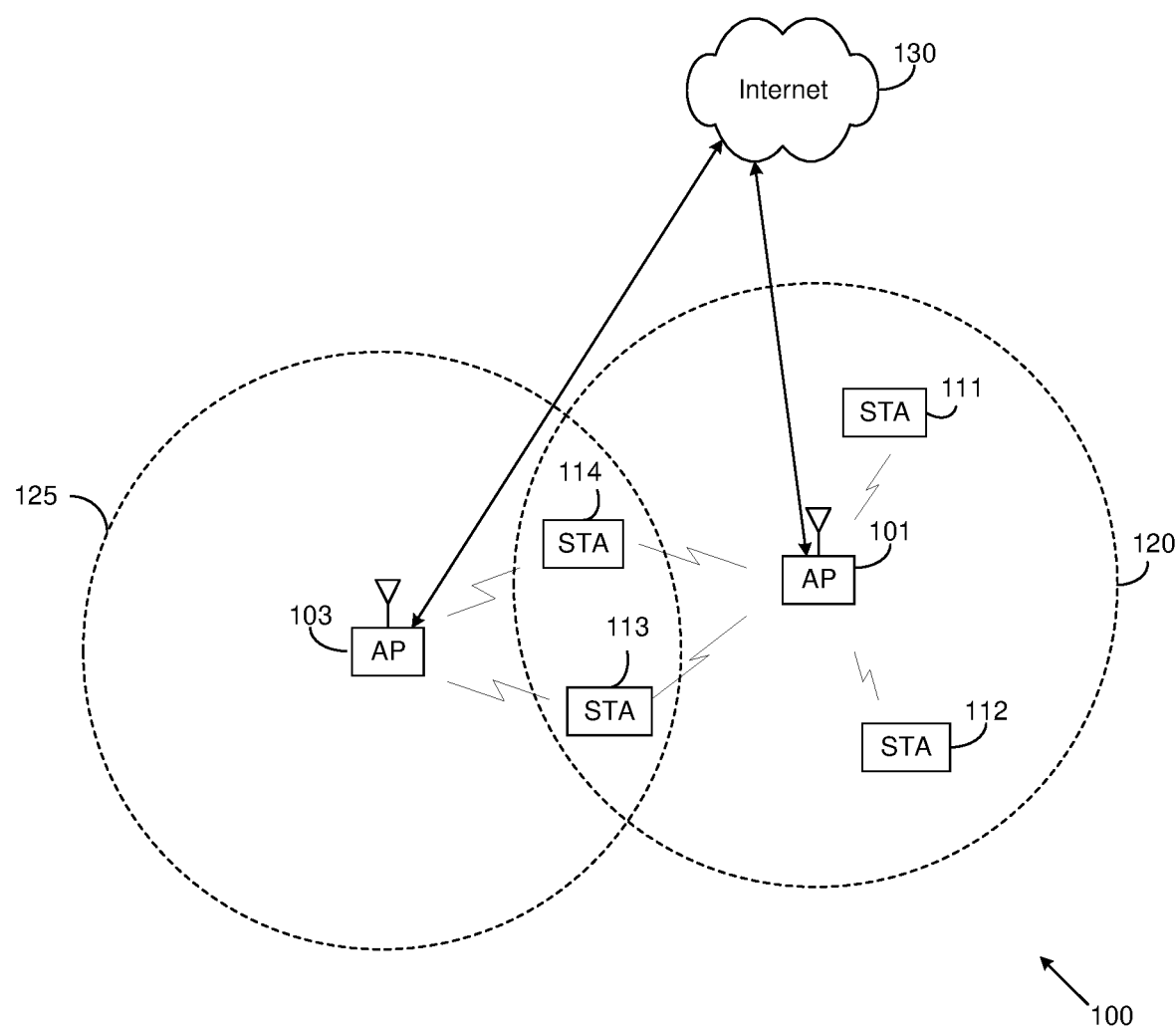
FIG. 1 illustrates an example wireless network according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that traffic profile information for a traffic stream is valuable to the STA (or MLD). Knowledge of traffic profile information enables the STA to compute the values of the fields used in the TSPEC element, which in turn relate to calculation of TWT parameters (such as the TWT interval, TWT service period (SP) duration, and initial wake time or offset) that affect the power savings and additional latency introduced by TWT operation.

Embodiments of the present disclosure also recognize that, in many cases, the STA may not have all of the necessary traffic profile information (also referred to as traffic characteristics) to accurately determine TWT parameters, especially for the downlink (DL) traffic. The DL traffic timing can be affected by a number of factors (e.g., TWT settings, high channel access contention, etc.). In such cases, while the STA is aware of the uplink (UL) traffic profile since the UL traffic is generated at the STA, the STA can only estimate the DL traffic profile. Therefore, the DL timing information for a traffic stream may not be accurate for the computation of some of the TWT parameters.

Furthermore, while it is possible to derive information about a traffic profile from knowledge of the behavior of an application that generates the traffic, many current applications support more than one type of traffic. For example, social media applications typically support video, audio, and messaging related features. Additionally, multiple applications can be run from within some applications such as web browsers. Therefore, knowledge of the application running may not enable the STA to determine the necessary traffic profile information for the DL traffic.

Accordingly, embodiments of the present disclosure provide apparatuses and methods that enable a STA to request relevant traffic information from another STA. In particular, the embodiments define an information element (IE) referred to as a traffic profile request element (or IE), or TSPEC Request element (or IE), which can be sent from one STA to another STA to request traffic information. For simplicity, the embodiments of the following disclosure are discussed with respect to a STA requesting DL traffic characteristics from an AP. However, it is understood that these methods and apparatuses can be adapted for any suitable WI-FI device. For example, a non-AP MLD could request DL traffic characteristics from an AP MLD, an AP could request UL traffic characteristics from a STA, or an AP MLD could request UL traffic characteristics from a non-AP MLD.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for processing a request for traffic characteristics in a WLAN. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
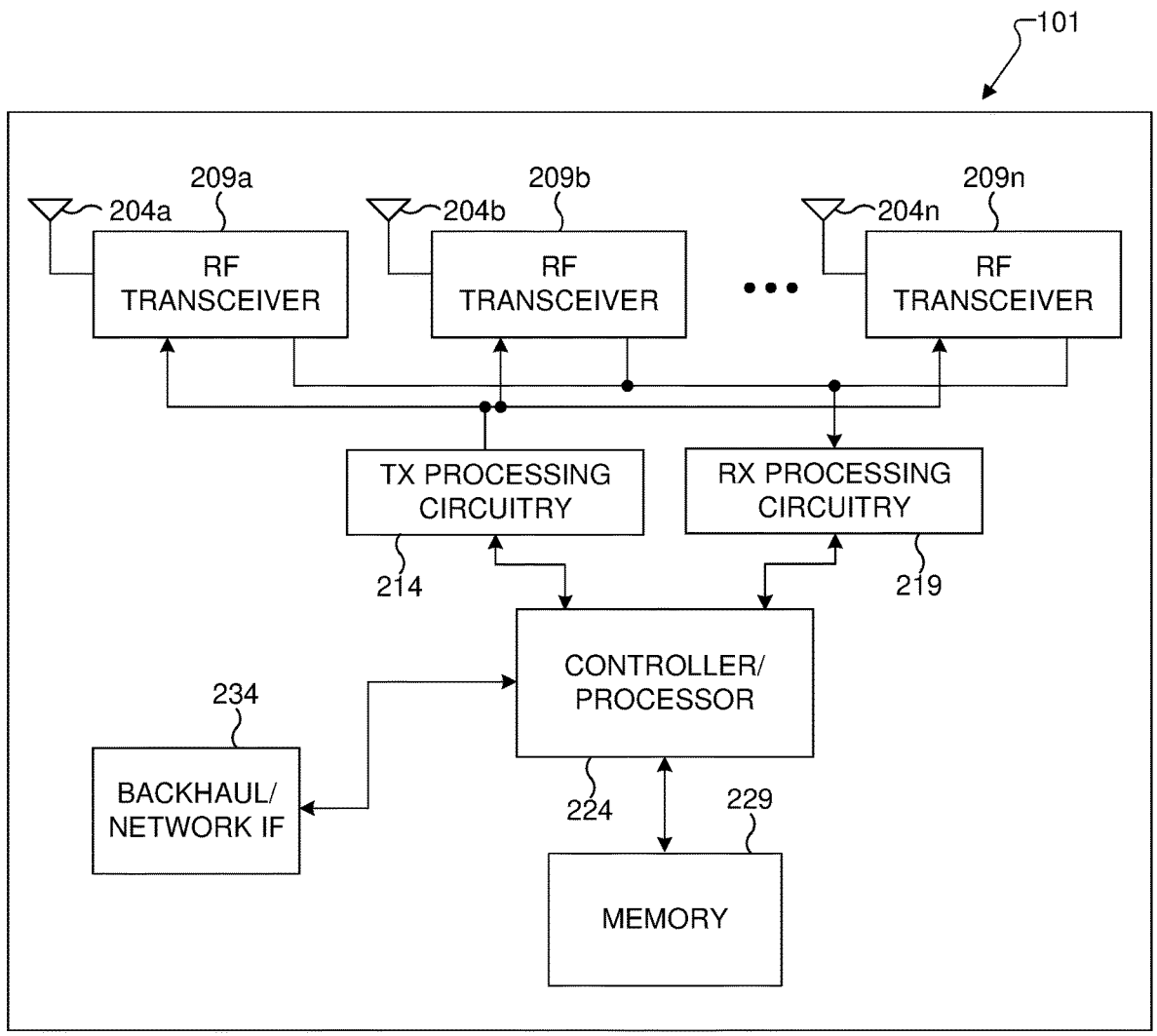
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including processing a request for traffic characteristics in a WLAN and generating a response to the request. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for processing a request for traffic characteristics in a WLAN. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
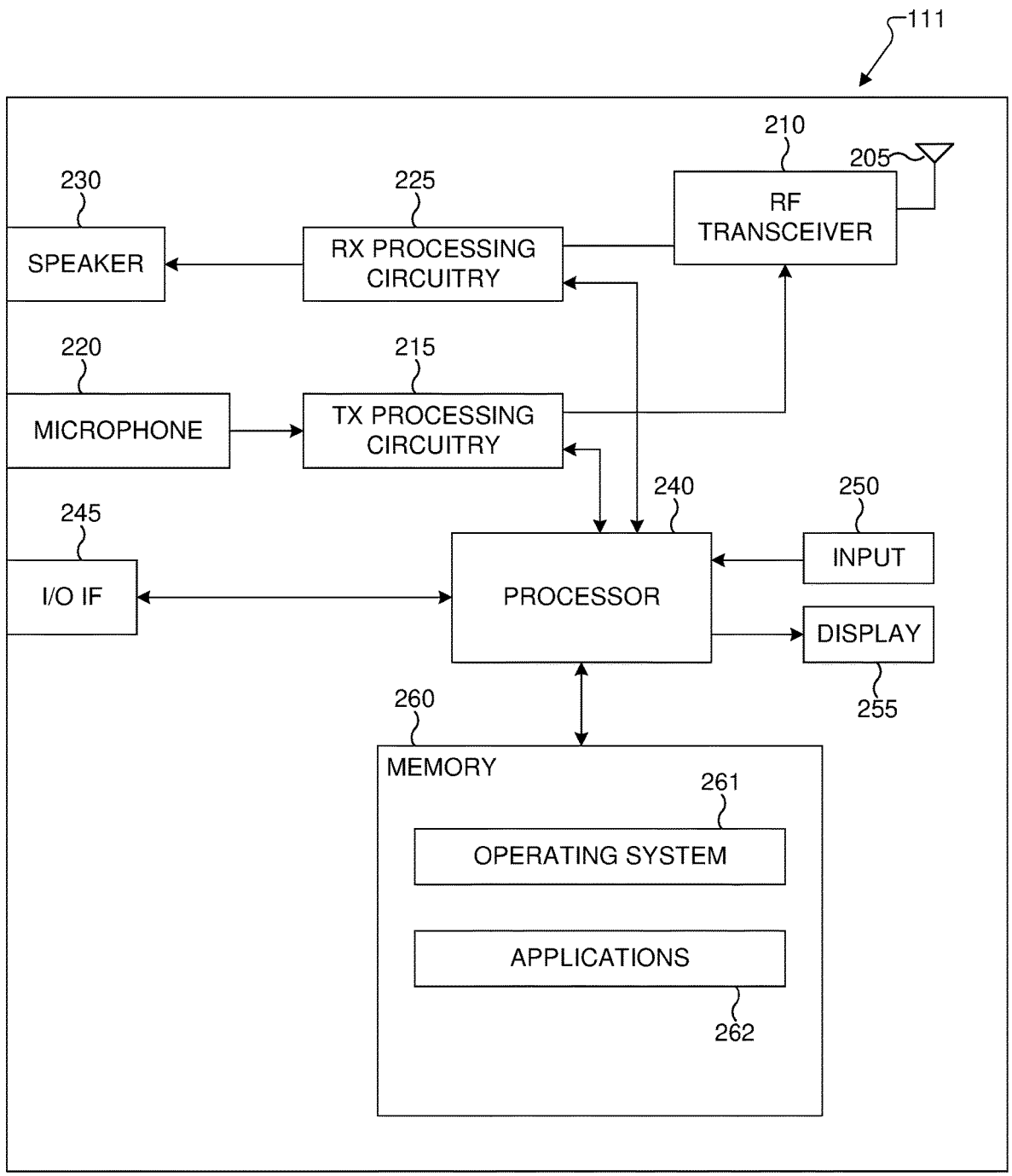
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to generate a request for traffic characteristics in a WLAN. In some embodiments, the controller/processor 240 includes at least one microprocessor or microcontroller.

The controller/processor 240 is also capable of executing other processes and programs resident in the memory 260, such as operations for generating a request for traffic characteristics in a WLAN. The controller/processor 240 can move data into or out of the memory 260 as required by an executing process. In some embodiments, the controller/processor 240 is configured to execute a plurality of applications 262, such as applications for generating traffic profile request elements including a request for traffic characteristics of an AP. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
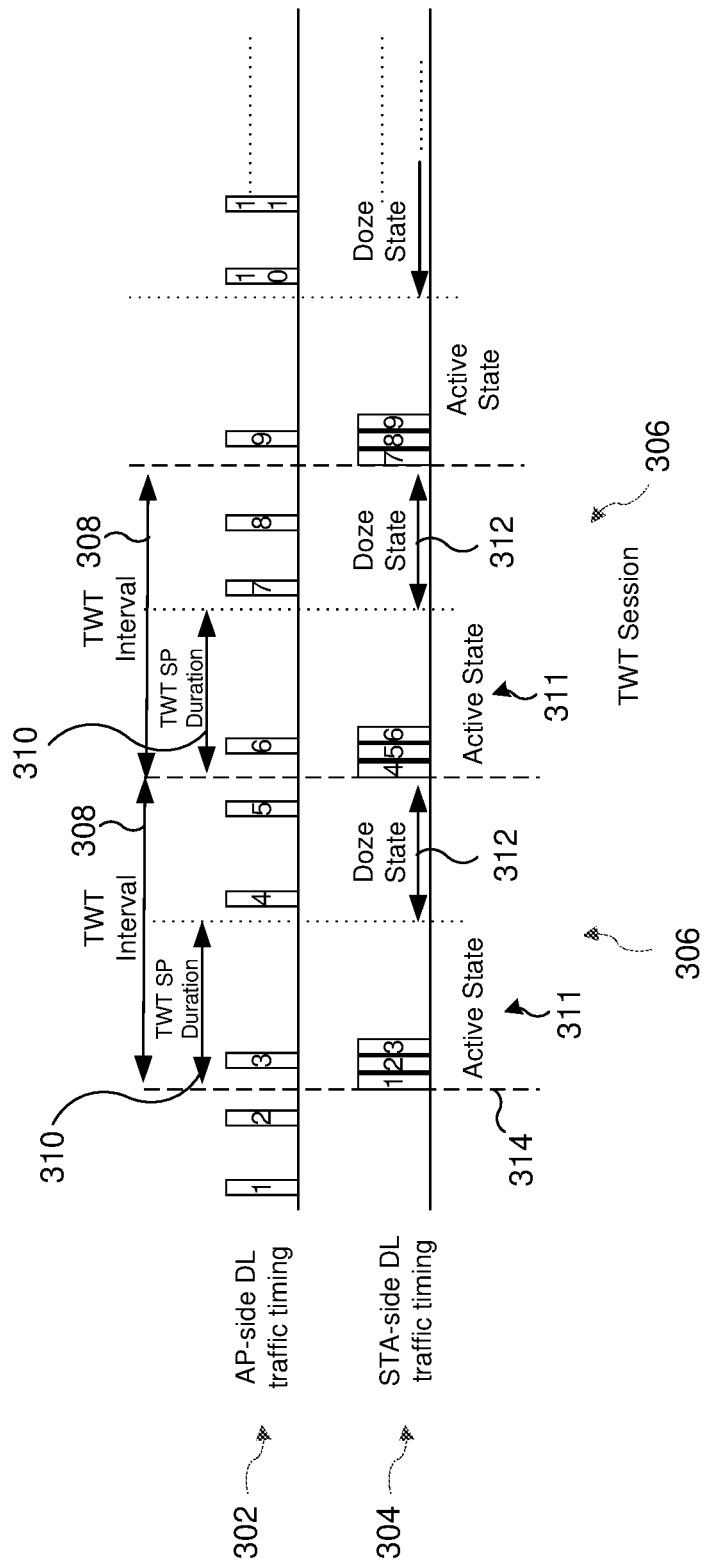
FIG. 3 illustrates an example of DL traffic packet timing between an AP and an associated client STA in a TWT operation according to embodiments of the present disclosure.

FIG. 3 illustrates an example of DL traffic packet timing between an AP and an associated client STA in a TWT operation according to various embodiments of the present disclosure. The example of FIG. 3 illustrates only DL traffic for simplicity, but it is understood that UL traffic could be included in the traffic flow as well.

The top graph 302 illustrates the timing of DL traffic packet arrival at the AP. The bottom graph 304 illustrates the timing of DL traffic packet arrival at the STA. In this scenario, it is assumed that a previous TWT negotiation has occurred between the AP and STA, which are therefore operating under a set of existing TWT parameters that give rise to consecutive TWT sessions 306. Each TWT session 306 is defined as the time period from the beginning of a TWT interval 308 to the end of the TWT interval 308. The TWT operation begins at an initial wake time (e.g., indicated by the TWT start time 314). These negotiated parameters highly affect latency, throughput, and power efficiency, which are directly related to the QoS (quality of service) a customer experiences. Services with different traffic characteristics can have different TWT parameter configurations for better QoS.

Each TWT session 306 includes two states: an active state 311, defined by a TWT SP duration 310 (during which the STA is awake to communicate with the AP), and a power save state or doze state 312 (during which the STA is not actively awake or communicating with the AP). Accordingly, DL traffic packets do not arrive at the STA outside of the TWT SP duration 310. The DL traffic timing can be affected by a number of factors, such as TWT settings, high channel access contention, or the like. As a result, the STA does not have accurate information on when the DL traffic packets arrived at the AP for transmission to the STA. For example, in the case of high channel access contention, timing information may be disordered, and hence information like burst size and service starting time may be inaccurate, and the STA may not be able to accurately characterize the traffic profile information (e.g., the STA could inaccurately compute parameters such as burst size, traffic type, etc.).

As traffic patterns change over time, the existing TWT parameters may become suboptimal, resulting in degradation of QoS for the user due to lost packets or unnecessary additional latency introduced by TWT operation, which outweighs the power savings provided by TWT operation. Accordingly, the STA may attempt to determine updated TWT parameters to better suit the traffic flow. However, since the STA does not have the DL traffic characteristics at the AP-side, it lacks information to best determine updated TWT parameters.

Procedures of the present disclosure enable the request of traffic information by the STA from the AP. In particular, the procedures can be used by the STA to request traffic characteristic information that can be used for negotiating an updated TWT agreement with the AP—e.g., to assist the STA to specify a suggested or demanded set of TWT parameters in a TWT Setup procedure (e.g., using Suggest TWT and Demand TWT in TWT Setup Command). Such traffic characteristic information can be, for example, information about the expected traffic pattern in the DL for a traffic flow for the STA. Knowledge of DL timing information (provided by the AP) coupled with UL timing information (available at the STA) can enable the STA to make a TWT parameter suggestion or demand suitable for both DL and UL considering its own power saving needs and latency sensitivity tolerance.

In the context of FIG. 3 the STA updates the TWT parameters through an updated TWT negotiation during an existing TWT session, however it is understood that the procedures of the present disclosure may also be applied during an initial TWT negotiation to establish a TWT session.

To facilitate the above-discussed request of traffic information, embodiments of the present disclosure include a new IE referred to as the TSPEC Request IE. The TSPEC Request IE can be sent by the STA to the AP to indicate a request by the STA for the AP to provide the traffic characteristics of a traffic flow as observed at the AP. Since the traffic flow is as observed at the AP, the traffic characteristics requested can be for the DL of the traffic flow. In some embodiments, the TSPEC Request IE can also be sent by the AP to the STA to indicate a request by the AP for the STA to provide the traffic characteristics of a traffic flow as observed at the STA. In this case, since the traffic flow is as observed at the STA, the traffic characteristics requested would be for the UL of the traffic flow.

A TSPEC Request IE may in some embodiments specifically request a TSPEC IE to be sent, however, in other embodiments a response to the request may provide traffic characteristics in any other suitable format. Accordingly, the TSPEC Request IE may be referred to more generally as a traffic profile request element.

Sending a frame including the TSPEC Request IE will consume airtime which otherwise could have been used for transmission of useful data frames. Consequently, sending the TSPEC Request IE imposes an overhead on the system. Accordingly, restrictions may be applied to the sending of the TSPEC Request IE to control the overhead. In some embodiments, a frequency constraint on sending of the TSPEC Request IE may be used as overhead control. For example, the STA may be permitted to send the TSPEC Request IE to the AP at most 10 times every 10 seconds. When restrictions are being followed, the AP may deny the TSPEC request if the restrictions are violated.

Figure 4:
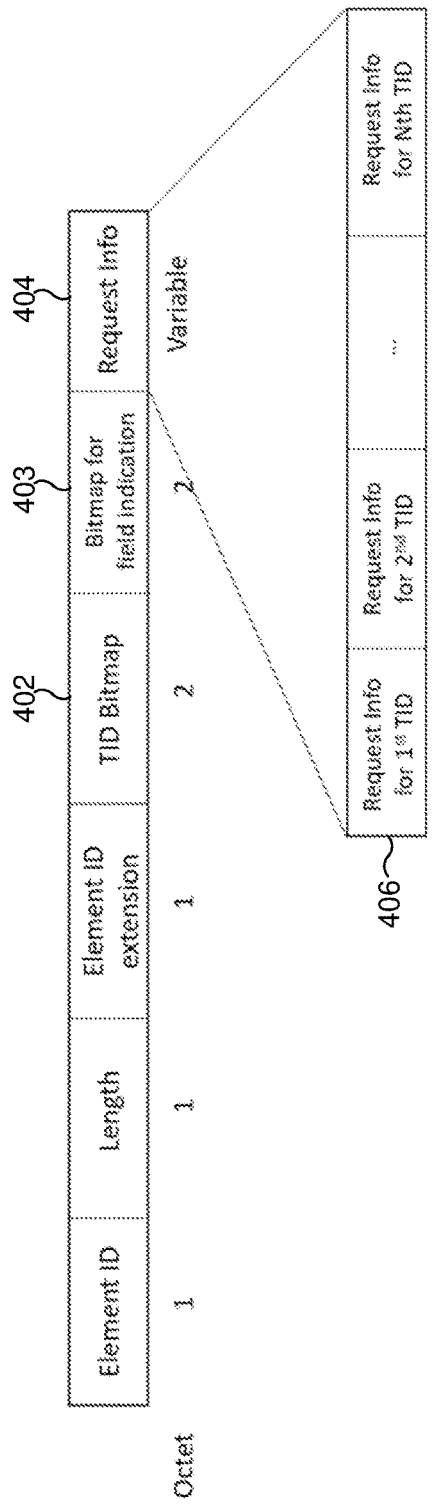
FIG. 4 illustrates an example TSPEC Request IE according to various embodiments of the present disclosure.

FIG. 4 illustrates an example TSPEC Request IE according to various embodiments of the present disclosure. The TSPEC Request IE can include a traffic identifier (TID) bitmap field 402. This field includes a TID bitmap that indicates the TID(s) for which traffic information is being requested.

In some embodiments, the TSPEC Request IE can also contain a bitmap (e.g., the bitmap for field indication 403) that indicates which fields of the TSPEC element the STA is requesting from the AP. It is understood that the TSPEC element could alternatively be a variant of the TSPEC, such as a TSPEC-lite or QoS characteristic element. If the AP accepts the request, it can then place the indicated fields in the TSPEC element that it sends to the STA.

The TSPEC Request IE can also include a Request Info field 404. For each TID indicated in the TID bitmap, the Request Info field 404 may include a set of subfields 406 that contains more details about the request for that particular TID. Each set of subfields 406 can also be considered a Request Info field for a particular TID. These sets of subfields may be ordered according to the TID in the bitmap to which they correspond (e.g., the $1^{st}$ set of subfields 406 corresponds to the $1^{st}$ TID indicated in the TID bitmap, the $2^{nd}$ set of subfields 406 corresponds to the $2^{nd}$ TID indicated in the TID bitmap, and so on).

Figure 5:
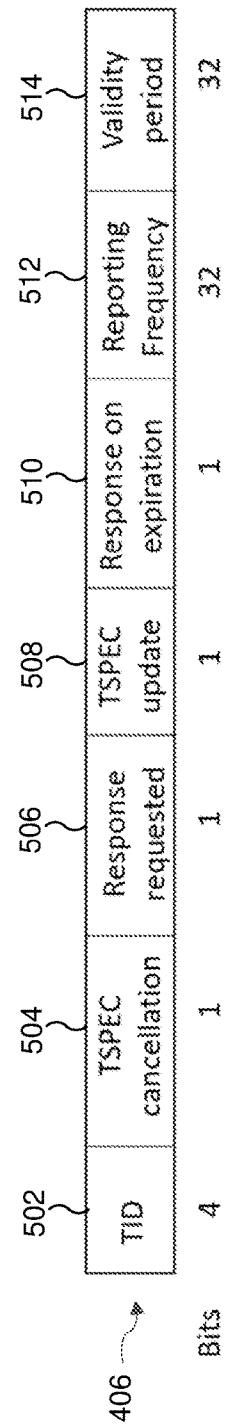
FIGS. 5 and 6 illustrate example subfields of a Request Info field of a TSPEC Request IE according to various embodiments of the present disclosure.
Figure 6:
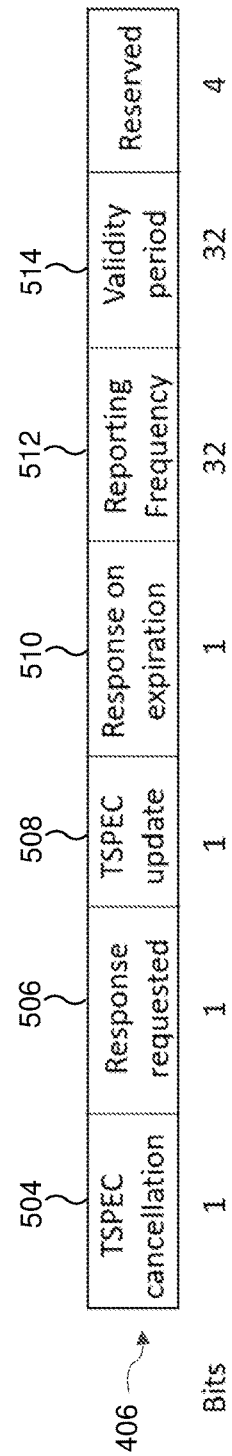

FIGS. 5 and 6 illustrate example subfields of the Request Info field 404 for one TID according to various embodiments of the present disclosure. Although the Request Info field 404 may include a set of subfields 406 for each TID indicated in the TID bitmap, the subfields included may be different for each TID (e.g., not all of the subfields are necessarily included for each TID).

In the example of FIG. 5, the subfields include a TID subfield 502, a TSPEC cancelation subfield 504, a Response requested subfield 506, a TSPEC update subfield 508, a Response on expiration subfield 510, a Reporting Frequency subfield 512, and a Validity period subfield 514.

The TID subfield 502 includes an explicit indication of the TID to which the set of subfields 406 applies. Explicitly indicating the TID can be useful in cases when a TSPEC request has been already made for a particular TID and the STA intends to cancel or modify the request and make a new request in the same TSPEC Request IE frame.

In some embodiments, the STA can use the TSPEC Request IE to cancel a previous TSPEC request for a particular TID. In such embodiments, the TSPEC cancelation subfield 504 bit is set to 1. When the AP receives a TSPEC Request IE with this bit set to 1, it will ignore all information in the remaining subfields for the indicated TID and cancel any previously approved TSPEC request for that TID. If the TSPEC cancelation bit is set to 0, then the AP uses the remaining subfields for the indicated TID to obtain further information about the request.

The STA can request from the AP a response to the TSPEC Request IE for a request made on the indicated TID (e.g., the STA can request an immediate response to the request even if the AP needs time to prepare a TSPEC frame including the requested traffic characteristics to send to the STA). In such a case, the Response requested subfield 506 is set to 1. If set to 0, then the AP may not send any immediate response to the TSPEC Request IE. Rather, it can send the TSPEC frame when the information for various fields in the frame becomes available at the AP.

If the TSPEC update subfield 508 is set to 1, and if the AP accepts the request, then after the first TSPEC frame is sent from the AP, all following TSPEC frames are sent only when there is an update to any of the information in the TSPEC. If the information is not updated, then the AP does not or may not send additional TSPECs. However, if this bit is set to 0, then the AP sends all following TSPEC frames regardless of whether any of the information in the TSPEC has been updated or not.

If the Response on expiration subfield 510 is set to 1, it indicates that the STA sending the request expects the AP to send a response when the request for the indicated TID expires. The time at which the request expires is indicated by the Validity period subfield 514.

The Reporting Frequency subfield 512 can be used by the STA to request a reporting frequency for TSPECs corresponding to the indicated TID to reduce the amount of overhead the STA has to receive. The reporting frequency can be specified in terms of the amount of time that must pass between two consecutive TSPECs sent by the AP containing information for the indicated TID.

In order to ensure that the number of TSPEC frames generated by the AP does not build over time with each TSPEC Request for a new category, the STA can impose a validity period, indicated by the Validity period subfield 514. If the AP accepts the request, it sends TSPECs for the indicated TID only during this validity period. Following this validity period, the AP can discard the request. Therefore, the STA may need to send another TSPEC Request for the indicated TID prior to the expiration of the previous request.

In the example of FIG. 6, the subfields are largely the same as those in the example of FIG. 5, except that the TID subfield 502 is not present. In this case, the TID to which the set of subfields 406 corresponds is implicitly indicated. For example, the position of the set of subfields 406 within the Request Info field 404 may implicitly indicate which TID in the TID bitmap the set of subfields 406 corresponds to.

Upon receiving the TSPEC request IE from a STA, an AP may respond in various ways. In one embodiment, the AP can simply send the requested information to the STA using the TSPEC element. In other embodiments, the AP can send a response to the TSPEC request IE in the form of a response frame. The AP may then send the requested information at a later time (e.g., after the information is available to the AP), or the AP may not send the requested information at all (e.g., when the AP rejects the request).

Figure 7:
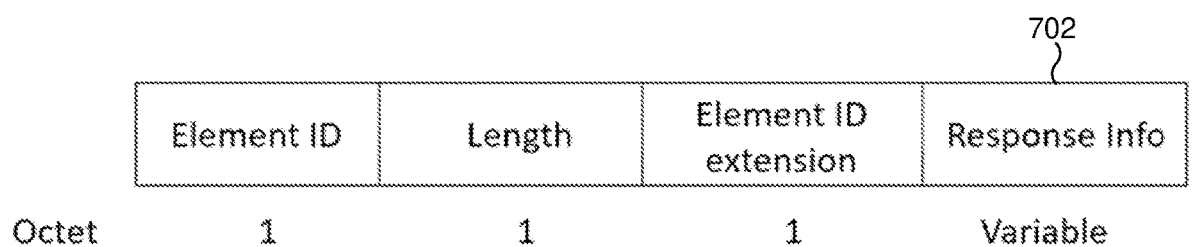
FIG. 7 illustrates an example response frame that the AP may send to the STA in response to the TSPEC request IE according to various embodiments of the present disclosure.

FIG. 7 illustrates an example response frame that the AP may send to the STA in response to the TSPEC request IE according to various embodiments of the present disclosure. The response frame includes a contains a Response Info field 702 which contains a response that indicates the status of the request for each TID which was indicated by the STA in the TSPEC Request IE (e.g., in the TID bitmap 402). In other embodiments, the Response Info field 702 may also contain a response for any TID previously indicated in a TSPEC request from the STA.

In some embodiments, the response frame may not be sent by the AP as a direct response to a TSPEC request IE. Instead, it may be generated independently to communicate the status of a previous request (e.g., upon expiration of the validity period of the request).

Figure 8:
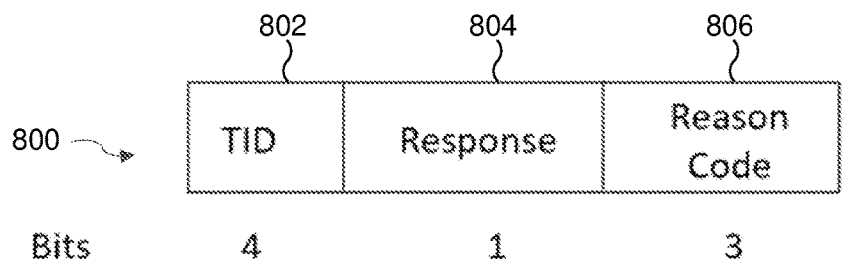
FIG. 8 illustrates a set of subfields of a Response Info field of a response frame according to various embodiments of the present disclosure.

For each TID for which the AP generates a response, the Response Info field 702 can include the set of subfields 800 illustrated in FIG. 8. The TID subfield 802 indicates the TID to which the response corresponds (i.e., the TID to which the remaining subfields in the set correspond).

The Response subfield 804 indicates the response of the AP to the request for the indicated TID. A value of 1 indicates that the AP has accepted the request and is actively working on the request. In embodiments in which the STA uses the TSPEC Request IE to specifically request a TSPEC element, a value of 1 indicates that the AP is working on generating a TSPEC. Alternatively, it indicates that the AP is working on generating a response containing the requested traffic profile characteristics in another suitable format. In embodiments in which the STA uses the TSPEC Request IE to cancel a previous TSPEC request for the indicated TID, a value of 1 indicates that the TSPEC request is canceled as requested by the STA.

In embodiments in which the response frame is generated as a direct response to a received TSPEC Request IE, a value of 0 in the Response subfield 804 indicates that the AP has rejected the request of the STA. In embodiments in which the response frame is independently generated by the AP, this subfield can be used instead to indicate expiration of a previous TSPEC request for the indicated TID.

The Reason Code subfield 806 may be used to provide additional information explaining the response of the AP in the Response subfield 804. Table 1 provides a set of example reason codes that can be used to further explain the response.

TABLE 1

| Reason Code (decimal value) | Meaning |
| --- | --- |
| 0 | AP will generate a TSPEC corresponding to the characteristics of the DL traffic flow for the indicated TID |
| 1 | Information is not available (e.g., because traffic stream of the indicated TID is no longer active) |
| 2 | Request constraint violation |
| 3 | Cancelation request from the STA |
| 4 | Previously made request has expired |
| 5 | Other |

Although the above embodiments discuss a STA using a TSPEC Request IE to request DL traffic characteristics from an AP, the TSPEC Request IE can also support a request for traffic information sent by an AP to a STA. In such embodiments, the TSPEC Request IE can be sent by the AP to the STA to indicate a request by the AP for the STA to provide the traffic characteristics of a traffic flow as observed at the STA. Since the traffic flow is as observed at the STA, the traffic characteristics requested are for the UL of the traffic flow.

Upon receiving the TSPEC request IE, the STA can send the requested information using the TSPEC element to the AP. In this case, the TSPEC element corresponds to the characteristics of the traffic flow in UL for the TIDs indicated in the request.

The request and response procedures described above with respect to FIGS. 3-8 may be straightforwardly adapted for such embodiments. The procedure can be used by the AP to obtain UL traffic characteristic information that can be used for negotiating a TWT agreement with the STA. In particular, a TWT interval and SP duration schedule can be determined based on TSPEC information provided by the responding STA.

Furthermore, while the above procedures have described for DL and UL of a traffic flow between a STA and an AP, the same procedures can be applied for a direct (peer-to-peer) link between a STA and another STA as well.

In some embodiments, information indicating traffic characteristics or traffic profile information (e.g., information related to fields in the TSPEC) can be transmitted as per-packet traffic information in a medium access control (MAC) header. For example, an AP can send a STA per-packet traffic information for DL traffic using MAC headers of the DL packets in the traffic flow. Likewise, a STA can send an AP per-packet traffic information for UL traffic using MAC headers of the UL packets in the traffic flow.

FIGS. 9 and 10 illustrate example MAC header formats including per-packet traffic information according to various embodiments of the present disclosure. For simplicity, the examples of FIGS. 9 and 10 are discussed as packets sent from an AP to a STA (e.g., DL packets), but it understood that the same formats could apply to packets sent from the STA to the AP (e.g., UL packets).

In the embodiment of FIG. 9, the MAC header 900 includes an additional timestamp subfield 902. The timestamp subfield 902 includes an AP-side timestamp for each packet. This timestamp can enable the STA to compute some traffic-related parameters (e.g., burst size) upon receipt of the packet.

In the embodiment of FIG. 10, the MAC header 1000 includes an additional buffering time subfield 1002, instead of the timestamp subfield 902. The buffering time subfield 1002 includes the buffering time for the packet at the AP-side. Upon receipt of the packet, the STA can subtract the buffering time from the receipt time to obtain the original packet timestamp, which can then enable the STA to compute traffic-related parameters similar to the information in the timestamp subfield 902.

Embodiments using the MAC header to indicate traffic characteristics may be used, for example, in cases in which the AP is unable to generate a TSPEC frame to send to the STA. This process may be used to provide traffic characteristics in response to a received traffic profile request (such as a TSPEC Request IE), or this process may be used to provide traffic characteristic information for a traffic flow (e.g., in each packet in the traffic flow) without any requests involved.

In other embodiments, the TSPEC Request IE can be included in the stream classification service (SCS) Descriptor element of an SCS Request frame sent by the STA to the AP. Upon receiving an SCS Descriptor element containing a TSPEC Request IE, the AP can process the request to generate a TSPEC element and transmit it either independently or by using the SCS Response Frame discussed above. FIG. 11 illustrates an example SCS Descriptor element containing a TSPEC Request IE 1102 according to various embodiments of the present disclosure.

In some embodiments, the AP may transmit the TSPEC element to the STA in an unsolicited manner. During this transmission, the TSPEC element can either be transmitted independently or as a part of an SCS Response frame. Similarly, the AP may use the SCS Request Frame to send the TSPEC Request IE to the STA. In this case, the STA can respond by sending a TSPEC element to the AP using the SCS Response Frame. In a similar manner, the above embodiment can also be applied to other types of request-response frames available in the 802.11 standards.

Figure 12:
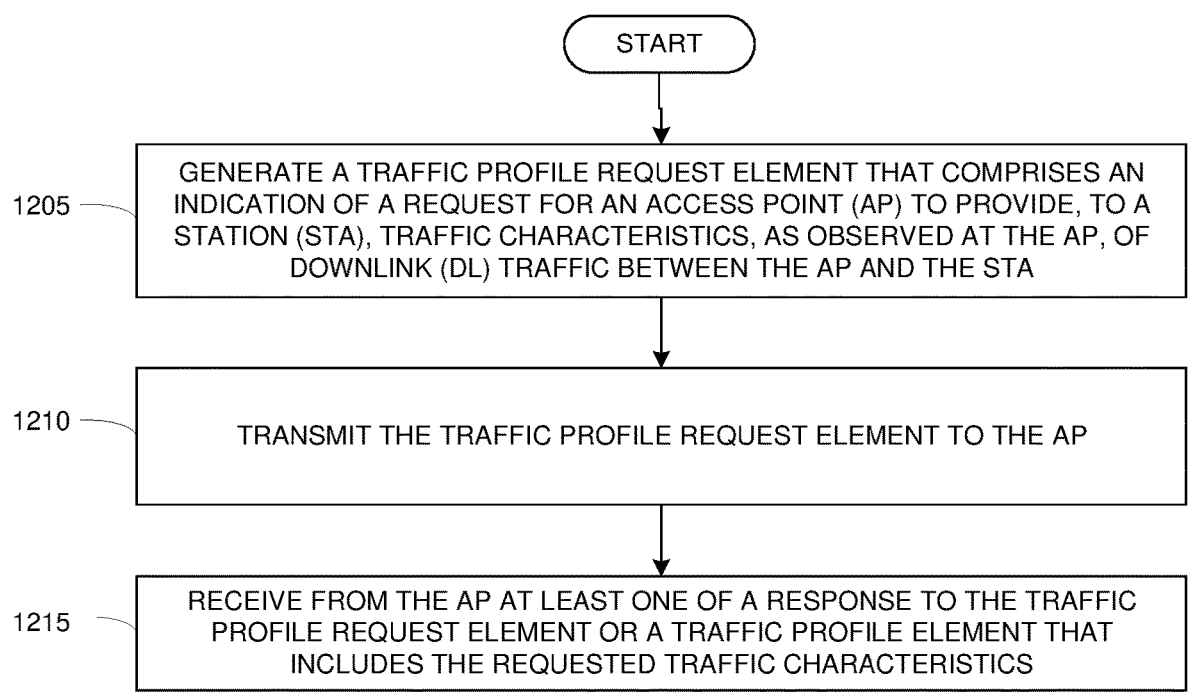
FIGS. 12-14 illustrate example processes for requesting traffic characteristics in a wireless network according to various embodiments of the present disclosure.

FIG. 12 illustrates an example process for requesting traffic characteristics in a wireless network according to various embodiments of the present disclosure. The process of FIG. 12 is discussed as being performed by a STA requesting DL traffic characteristics from a corresponding AP, but it is understood that an AP could perform the same process to request UL traffic characteristics from a corresponding STA. Additionally, for convenience, the process of FIG. 12 is discussed as being performed by a WI-FI STA, but it is understood that any suitable wireless communication device could perform these processes.

Beginning at step 1205, the STA generates a traffic profile request element that comprises an indication of a request for the AP to provide, to the STA, traffic characteristics, as observed at the AP, of DL traffic between the AP and the STA. The traffic profile request element may be a TSPEC Request IE as discussed herein above. If received, the requested traffic characteristics are used to determine TWT parameters for a TWT operation between the AP and the STA.

The STA then transmits the traffic profile request element to the AP (step 1210). In some embodiments, the STA also receives from the AP a frequency constraint that indicates a maximum amount of times that the STA is permitted to transmit the traffic profile request element within a time window. If this constraint is being used, step 1210 may only be performed according to the constraint.

In some embodiments, the traffic profile request element includes several fields of information. These fields can include a TID bitmap that indicates TIDs for which the traffic characteristics are requested, and a request information field related to each of the indicated TIDs (e.g., a set of request information subfields 406 of FIG. 4). Each request information field comprises, for the related TID, an indication of whether the STA requests cancelation of a previous request, an indication of whether the STA requests a response to the traffic profile request element in addition to the traffic characteristics, an indication of whether the STA requests the AP to provide the traffic characteristics only when the traffic characteristics are updated at the AP, an indication of a validity period for which the request is to remain valid, an indication of whether the STA requests the AP to send a response upon expiration of the validity period, and an indication of a frequency with which the STA requests the AP to provide the traffic characteristics. In some embodiments, each request information field also explicitly indicates the TID for which the remaining information applies, while in other embodiments the TID is implicitly indicated by the position of the request information field (e.g., each request information field may be positioned such that it corresponds to a TID indicated in the TID bitmap).

If the traffic profile request element is requesting a response in the form of a particular traffic profile element with a known format, such as a TSPEC element, the traffic profile request element further includes a bitmap that indicates which of a plurality of fields of the traffic profile element the STA expects to receive (e.g., the bitmap 403 of FIG. 4). That is, the STA may request less than all of the possible fields of information in the traffic profile element.

The STA then receives from the AP at least one of a response to the traffic profile request element or a traffic profile element that includes the requested traffic characteristics (step 1215). The traffic profile element can be a TSPEC element. The response to the traffic profile request element may be sent before the traffic profile element itself, and includes a response information field related to each TID for which the traffic characteristics are requested.

Each response information field comprises an indication of which TID the response information field relates to and further comprises, for the related TID, one of an indication of whether the AP has accepted the request and is generating the traffic profile element that includes the requested traffic characteristics, an indication of whether the AP has canceled a previous request for the traffic characteristics, or an indication of whether a validity period of a previous request for the traffic characteristics has expired. If the response information field indicates that the AP has not accepted the request for the related TID, the response information field further comprises an indication of whether the requested traffic characteristics are unavailable or whether the request violates a frequency constraint.

Figure 13:
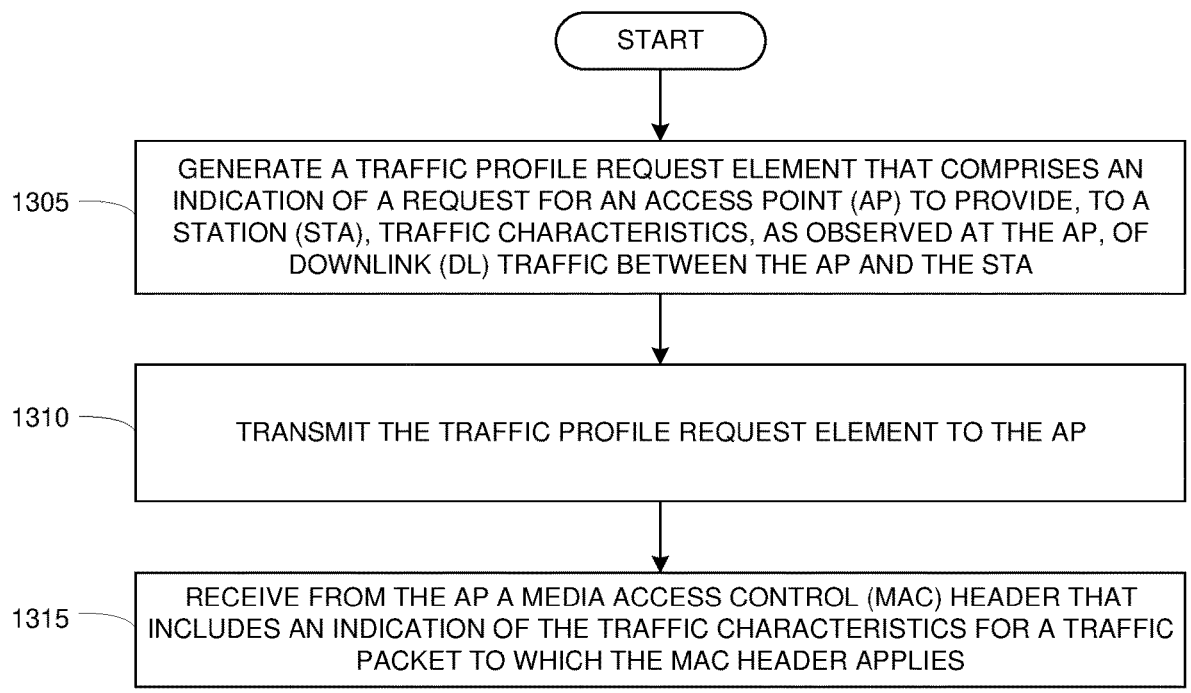

FIG. 13 illustrates another example process for requesting traffic characteristics in a wireless network according to various embodiments of the present disclosure. The process of FIG. 13 is similar to the process of FIG. 12, using a MAC header to receive the traffic characteristics. The process of FIG. 13 is discussed as being performed by a STA requesting DL traffic characteristics from a corresponding AP, but it is understood that an AP could perform the same process to request UL traffic characteristics from a corresponding STA. Additionally, for convenience, the process of FIG. 13 is discussed as being performed by a WI-FI STA, but it is understood that any suitable wireless communication device could perform these processes.

Steps 1305 and 1310 are substantially similar to steps 1205 and 1210, respectively, of FIG. 12, and are not repeated.

At step 1315, the STA receives from the AP a MAC header that includes an indication of the traffic characteristics for a traffic packet to which the MAC header applies. In some embodiments, the indication may be a timestamp at the AP-side for the packet, or a buffering time of the packet at the AP-side, from which the STA can derive the timestamp. The STA can then use the timestamp to derive some traffic-related parameters.

Figure 14:
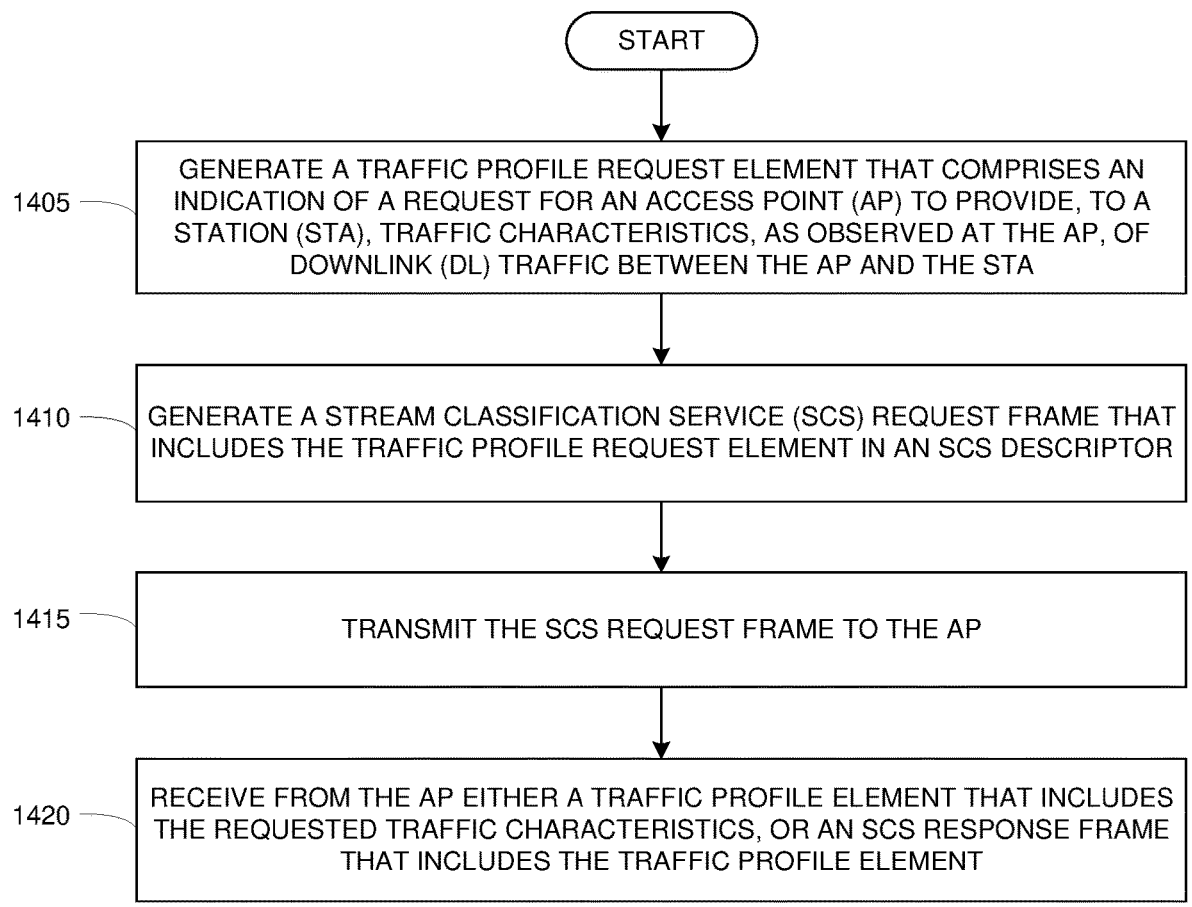

FIG. 14 illustrates another example process for requesting traffic characteristics in a wireless network according to various embodiments of the present disclosure. The process of FIG. 14 is similar to the process of FIG. 12, using an SCS Request-Response procedure to send the request and receive the traffic characteristics. The process of FIG. 14 is discussed as being performed by a STA requesting DL traffic characteristics from a corresponding AP, but it is understood that an AP could perform the same process to request UL traffic characteristics from a corresponding STA. Additionally, for convenience, the process of FIG. 14 is discussed as being performed by a WI-FI STA, but it is understood that any suitable wireless communication device could perform these processes.

Step 1405 is substantially similar to step 1205 of FIG. 12, and is not repeated.

At step 1410, the STA generates an SCS Request frame that includes the traffic profile request element in an SCS Descriptor.

At step 1415, the STA transmits the SCS Request frame including the traffic profile request element to the AP.

Next, the STA receives from the AP either a traffic profile element that includes the requested traffic characteristics, or an SCS Response frame that includes the traffic profile element (step 1420). In some embodiments, the traffic profile element is a TSPEC element.

The above flowcharts illustrate example methods that can be implemented in accordance with the principles of the present disclosure and various changes could be made to the methods illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A wireless station (STA) device comprising:
   a transceiver configured to transmit and receive signals; and
   a processor operably coupled to the transceiver, the processor configured to generate a traffic profile request element that comprises an indication of a request for an access point (AP) to provide, to the STA, traffic characteristics, as observed at the AP, of downlink (DL) traffic between the AP and the STA, wherein the traffic characteristics are not known to the STA at a time the traffic profile request element is generated,
wherein the transceiver is further configured to transmit to the AP the traffic profile request element, and
wherein the requested traffic characteristics are used to determine target wake time (TWT) parameters for a TWT operation between the AP and the STA.

2. The STA of claim 1, wherein the transceiver is further configured to receive from the AP a frequency constraint that indicates a maximum amount of times that the STA is permitted to transmit the traffic profile request element within a time window.

3. The STA of claim 1, wherein:
the traffic profile request element includes:
 a traffic identifier (TID) bitmap that indicates TIDs for which the traffic characteristics are requested,
 a request information field related to each of the indicated TIDs, and
 a bitmap that indicates, for a traffic profile element including the requested traffic characteristics that the STA expects to receive from the AP in response to the request, which of a plurality of fields of the traffic profile element the STA expects to receive; and
each request information field comprises, for the related TID:
 an indication of whether the STA requests cancelation of a previous request,
 an indication of whether the STA requests a response to the traffic profile request element in addition to the traffic characteristics,
 an indication of whether the STA requests the AP to provide the traffic characteristics only when the traffic characteristics are updated at the AP,
 an indication of a validity period for which the request is to remain valid,
 an indication of whether the STA requests the AP to send a response upon expiration of the validity period, and
 an indication of a frequency with which the STA requests the AP to provide the traffic characteristics.

4. The STA of claim 1, wherein the transceiver is further configured to receive from the AP at least one of a response to the traffic profile request element or a traffic profile element that includes the requested traffic characteristics.

5. The STA of claim 4, wherein:
the response to the traffic profile request element includes a response information field related to each TID for which the traffic characteristics are requested;
each response information field comprises an indication of which TID the response information field relates to and further comprises, for the related TID, one of:
 an indication of whether the AP has accepted the request and is generating the traffic profile element that includes the requested traffic characteristics,
 an indication of whether the AP has canceled a previous request for the traffic characteristics, or
 an indication of whether a validity period of a previous request for the traffic characteristics has expired; and
based on the response information field indicating that the AP has not accepted the request for the related TID, the response information field further comprises an indication of whether the requested traffic characteristics are unavailable or whether the request violates a frequency constraint.

6. The STA of claim 1, wherein the transceiver is further configured to receive from the AP a media access control (MAC) header that includes an indication of the requested traffic characteristics for a traffic packet to which the MAC header applies.

7. The STA of claim 1, wherein:
the processor is further configured to generate a stream classification service (SCS) request frame that includes the traffic profile request element in an SCS descriptor; and
the transceiver is further configured to:
 transmit to the AP the SCS request frame; and
 receive from the AP either a traffic profile element that includes the requested traffic characteristics, or an SCS response frame that includes the traffic profile element.

8. A wireless access point (AP) device comprising:
a transceiver configured to receive from a station (STA) a traffic profile request element that comprises an indication of a request for the AP to provide, to the STA, traffic characteristics, as observed at the AP, of downlink (DL) traffic between the AP and the STA, wherein the traffic characteristics are not known to the STA at a time the traffic profile request element is generated; and
a processor operably coupled to the transceiver, the processor configured to generate a traffic profile element that includes the requested traffic characteristics,
wherein the requested traffic characteristics are related to target wake time (TWT) parameters for a TWT operation between the AP and the STA.

9. The AP of claim 8, wherein:
the processor is further configured to generate a frequency constraint that indicates a maximum amount of times that the STA is permitted to transmit the traffic profile request element within a time window; and
the transceiver is further configured to transmit the frequency constraint to the STA.

10. The AP of claim 8, wherein:
the traffic profile request element includes:
 a traffic identifier (TID) bitmap that indicates TIDs for which the traffic characteristics are requested,
 a request information field related to each of the indicated TIDs, and
 a bitmap that indicates, for a traffic profile element including the requested traffic characteristics that the STA expects to receive from the AP in response to the request, which of a plurality of fields of the traffic profile element the STA expects to receive; and
each request information field comprises, for the related TID:
 an indication of whether the STA requests cancelation of a previous request,
 an indication of whether the STA requests a response to the traffic profile request element in addition to the traffic characteristics,
 an indication of whether the STA requests the AP to provide the traffic characteristics only when the traffic characteristics are updated at the AP,
 an indication of a validity period for which the request is to remain valid,
 an indication of whether the STA requests the AP to send a response upon expiration of the validity period, and
 an indication of a frequency with which the STA requests the AP to provide the traffic characteristics.

11. The AP of claim 8, wherein:
the processor is further configured to generate a response to the traffic profile request element; and the transceiver is further configured to transmit to the STA at least one of the response to the traffic profile request element, or the traffic profile element.

12. The AP of claim 11, wherein:
the response to the traffic profile request element includes a response information field related to each TID for which the traffic characteristics are requested;
each response information field comprises an indication of which TID the response information field relates to and further comprises, for the related TID, one of:
an indication of whether the AP has accepted the request and is generating the traffic profile element that includes the requested traffic characteristics,
an indication of whether the AP has canceled a previous request for the traffic characteristics, or
an indication of whether a validity period of a previous request for the traffic characteristics has expired; and
based on the response information field indicating that the AP has not accepted the request for the related TID, the response information field further comprises an indication of whether the requested traffic characteristics are unavailable or whether the request violates a frequency constraint.

13. The AP of claim 8, wherein:
the processor is further configured to generate a media access control (MAC) header that includes an indication of the requested traffic characteristics for a traffic packet to which the MAC header applies; and
the transceiver is further configured to transmit the MAC header to the STA.

14. The AP of claim 8, wherein:
the transceiver is further configured to receive a stream classification service (SCS) request frame that includes the traffic profile request element in an SCS descriptor;
the processor is further configured to generate an SCS response frame that includes the traffic profile element; and
the transceiver is further configured to transmit to the STA either the traffic profile element or the SCS response frame.

15. A method for requesting traffic characteristics in a wireless network, the method comprising:
generating a traffic profile request element that comprises an indication of a request for an access point (AP) to provide, to a station (STA), traffic characteristics, as observed at the AP, of downlink (DL) traffic between the AP and the STA, wherein the traffic characteristics are not known to the STA at a time the traffic profile request element is generated; and
transmitting the traffic profile request element to the AP, wherein the requested traffic characteristics are used to determine target wake time (TWT) parameters for a TWT operation between the AP and the STA.

16. The method of claim 15, further comprising receiving from the AP a frequency constraint that indicates a maximum amount of times that the STA is permitted to transmit the traffic profile request element within a time window.

17. The method of claim 15, wherein:
the traffic profile request element includes:
a traffic identifier (TID) bitmap that indicates TIDs for which the traffic characteristics are requested,
a request information field related to each of the indicated TIDs, and
a bitmap that indicates, for a traffic profile element including the requested traffic characteristics that the STA expects to receive from the AP in response to the request, which of a plurality of fields of the traffic profile element the STA expects to receive; and
each request information field comprises, for the related TID:
an indication of whether the STA requests cancelation of a previous request,
an indication of whether the STA requests a response to the traffic profile request element in addition to the traffic characteristics,
an indication of whether the STA requests the AP to provide the traffic characteristics only when the traffic characteristics are updated at the AP,
an indication of a validity period for which the request is to remain valid,
an indication of whether the STA requests the AP to send a response upon expiration of the validity period, and
an indication of a frequency with which the STA requests the AP to provide the traffic characteristics.

18. The method of claim 15, further comprising:
receiving from the AP at least one of a response to the traffic profile request element or a traffic profile element that includes the requested traffic characteristics,
wherein the response to the traffic profile request element includes a response information field related to each TID for which the traffic characteristics are requested,
wherein each response information field comprises an indication of which TID the response information field relates to and further comprises, for the related TID, one of:
an indication of whether the AP has accepted the request and is generating the traffic profile element that includes the requested traffic characteristics,
an indication of whether the AP has canceled a previous request for the traffic characteristics, or
an indication of whether a validity period of a previous request for the traffic characteristics has expired, and
wherein based on the response information field indicating that the AP has not accepted the request for the related TID, the response information field further comprises an indication of whether the requested traffic characteristics are unavailable or whether the request violates a frequency constraint.

19. The method of claim 15, further comprising receiving from the AP a media access control (MAC) header that includes an indication of the requested traffic characteristics for a traffic packet to which the MAC header applies.

20. The method of claim 15, further comprising:
generating a stream classification service (SCS) request frame that includes the traffic profile request element in an SCS descriptor;
transmitting the SCS request frame to the AP; and
receiving from the AP either a traffic profile element that includes the requested traffic characteristics, or an SCS response frame that includes the traffic profile element.

* * * * *